United States Patent
Liu et al.

(10) Patent No.: US 10,594,205 B2
(45) Date of Patent: Mar. 17, 2020

(54) HIGH-FREQUENCY HALF-WAVE RECTIFIER SYSTEM OF LOW-HARMONICITY AND HIGH-EFFICIENCY

(71) Applicant: NEWVASTEK CO., LTD., New Taipei (TW)

(72) Inventors: Ming Liu, New Taipei (TW); Chengbin Ma, New Taipei (TW); Ming-Liang Fang, New Taipei (TW); Chih-Hao Chuang, New Taipei (TW)

(73) Assignee: NEWVASTEK CO., LTD., New Taipei (TW)

( * ) Notice: Subject to any disclaimer, the term of this patent is extended or adjusted under 35 U.S.C. 154(b) by 0 days.

(21) Appl. No.: 16/052,576

(22) Filed: Aug. 1, 2018

(65) Prior Publication Data

US 2020/0044556 A1 Feb. 6, 2020

(51) Int. Cl.
*H02M 1/12* (2006.01)
*H02M 1/26* (2006.01)
*H02M 1/44* (2007.01)
*H02M 7/02* (2006.01)
*H02M 7/48* (2007.01)

(52) U.S. Cl.
CPC ............. *H02M 1/12* (2013.01); *H02M 1/44* (2013.01); *H02M 7/02* (2013.01)

(58) Field of Classification Search
CPC .......... H02M 1/12; H02M 1/126; H02M 1/44; H02M 7/02; H02M 2007/4815; H02M 2007/4818; H02M 2007/4822
See application file for complete search history.

(56) References Cited

U.S. PATENT DOCUMENTS

| | | | |
|---|---|---|---|
| 9,948,198 B2* | 4/2018 | Imai | H02M 3/158 |
| 10,211,737 B1* | 2/2019 | Costa | H02M 3/1584 |
| 2007/0171680 A1* | 7/2007 | Perreault | H02M 1/34 363/16 |
| 2014/0132231 A1* | 5/2014 | Tsai | H02M 3/155 323/223 |
| 2014/0247625 A1* | 9/2014 | Hosotani | H02M 3/33569 363/17 |
| 2014/0268899 A1* | 9/2014 | Hosotani | H02M 3/33569 363/17 |
| 2014/0313788 A1* | 10/2014 | Okubo | H02M 1/12 363/21.01 |
| 2015/0055374 A1* | 2/2015 | Yamashita | H02M 3/337 363/17 |

(Continued)

*Primary Examiner* — Jeffrey A Gblende
*Assistant Examiner* — Sisay G Tiku
(74) *Attorney, Agent, or Firm* — Leong C. Lei

(57) ABSTRACT

A high-frequency half-wave rectifier system of low-harmonicity and high-efficiency, which mainly comprises: a current output device having an output end and a first flow-return end respectively at both ends, a rectifying module, a resonant tuning unit, a first node, a voltage regulator module, at least one load element, a grounding portion, and at least one flow-return path. By means of the above structure, a simple circuit configuration and appropriate capacitance value setting are used to control the duty cycle of the rectifying module to approximately 74 nanoseconds and adjust the output power and improve the AC to DC conversion efficiency for the rectifying module under the low electromagnetic interference condition.

4 Claims, 4 Drawing Sheets

(56) References Cited

U.S. PATENT DOCUMENTS

| | | | |
|---|---|---|---|
| 2016/0241128 A1* | 8/2016 | Imai | H02M 7/537 |
| 2016/0241163 A1* | 8/2016 | Imai | H02M 7/537 |
| 2016/0322910 A1* | 11/2016 | Kovacevic | H02M 3/33576 |
| 2016/0352235 A1* | 12/2016 | Imai | H02M 3/33569 |
| 2017/0085189 A1* | 3/2017 | Madsen | H02M 3/33546 |
| 2017/0237302 A1* | 8/2017 | Sorge | H04B 5/0037 |
| | | | 307/104 |

* cited by examiner

HIGH-FREQUENCY HALF-WAVE RECTIFIER SYSTEM OF LOW-HARMONICITY AND HIGH-EFFICIENCY

(a) TECHNICAL FIELD OF THE INVENTION

The present invention provides a high-frequency half-wave rectifier system of low-harmonicity and high-efficiency, and especially relates to a half-wave rectifier system of low-harmonicity and high-efficiency which has simple structure and less use of electronic components, which is difficult to be heated, and which output power is adjustable, and which can reduce the electromagnetic interference.

(b) DESCRIPTION OF THE PRIOR ART

There is a significant demand for the charging of various low-power electronic devices, particularly wearable devices. This need has caused the use of inductively coupled Wireless Power Transfer (WPT) to become more and more popular in recent years. Great progress has been made in the design and application of systems operating at kHz power levels.

At the same time, for low-power applications, further increasing the voltage frequency, such as a few megahertz, will bring more spatial freedom, i.e., longer transmission distance and higher tolerance for misalignment of the coupled coils, and be expected to be used for construction a more compact and lighter WPT system.

The current common circuit configuration, as shown in FIG. 1, is a circuit distribution diagram of a conventional AC rectification circuit, and is a full-wave current-driven rectifier application in a megahertz WPT system.

Due to the sinusoidal input voltage and current, this kind of rectifier is expected to have the benefits of low harmonic content and high efficiency rectification.

However, in this circuit configuration, there are two diodes respectively on the path of the positive half-cycle and the negative half-cycle, so when the current passes through these four diodes, the heat will be generated. If the neighboring elements are affected by the EMI, the problem of heat generation will be more obvious, and the signal reception efficiency of this model will be not very ideal.

Therefore, the circuit configuration of the above-mentioned AC rectifying circuit really exists the following problems and lackings to be improved:

1. It must use more diodes, and it is easier to produce more heat.
2. Using more components, so that the overall volume cannot be reduced.
3. The AC/DC conversion is inefficient.
4. It is easily affected by the EMI issues, resulting in more serious heat generation problem.
5. When being applied to a low-power device, the interference problem is even more obvious, and it is even difficult to be integrated with a miniaturized device due to the volume problem.

SUMMARY OF THE INVENTION

The main object of the present invention is to simplify the complexity of the circuit composition and reduce the electronic components required for the transformer rectification operation.

Another main object of the present invention is to calculate and design an appropriate resonant capacitance (tuning capacitance) through an algorithm to reduce the harmonic characteristics of the circuit, reduce the heat source, increase the conversion efficiency, and improve the EMI problem.

To achieve the above-mentioned objects, the main structure of the present invention comprises: a current output device having an output end and a first flow-return end respectively at both ends for outputting alternating current; wherein the output end has a rectifying module connected in series for adjusting the output power, and the rectifying module has a resonant tuning unit connected in parallel for controlling the duty cycle of the rectifying module at a predetermined value; a first node defined in one side of the first flow-return end facing away from the current output device; a voltage regulator module; wherein one end of the voltage regulator module is connected in series with the rectifying module and the other end is connected to the first node; a load element connected in parallel with the voltage regulator module; a grounding portion set in one side of the load element; and at least one flow-return path defined between the first node and the first flow-return end for guiding the current flown out of the voltage regulator module to the current output device.

When a user uses the present invention to perform the high-frequency half-wave rectification, the AC output from the current output device flows through the output end to the rectifying module and the resonant tuning unit to set the capacitance value of the resonant tuning unit through the algorithm and control the duty cycle of the rectifying module to approach 74 nanoseconds; and thereby to achieve the progressiveness of reducing the harmonicity and electromagnetic interference.

After the current flows out of the rectifying module and the resonant tuning unit, and then flows through the voltage regulator module and the load element, the current will flow to the flow-return path through the first node, and then flow back into the current output device to achieve the half-wave AC rectification of high-frequency and low-power.

The present invention can overcome the problem that the conventional AC rectifying circuit has a large amount of diodes, a complicated circuit configuration, a large overall volume, a large heating area, but fails to provide a corresponding rectification efficiency, and so as to achieve the practical progressiveness with the above-mentioned advantages.

DETAILED DESCRIPTION OF THE PREFERRED EMBODIMENTS

The following descriptions are exemplary embodiments only, and are not intended to limit the scope, applicability or configuration of the invention in any way. Rather, the following detailed description provides a convenient illustration for implementing exemplary embodiments of the invention. Various changes to the described embodiments may be made in the function and arrangement of the elements described without departing from the scope of the invention as set forth in the appended claims.

The foregoing and other aspects, features, and utilities of the present invention will be best understood from the following detailed description of the preferred embodiments when read in conjunction with the accompanying drawings.

Figure 1:
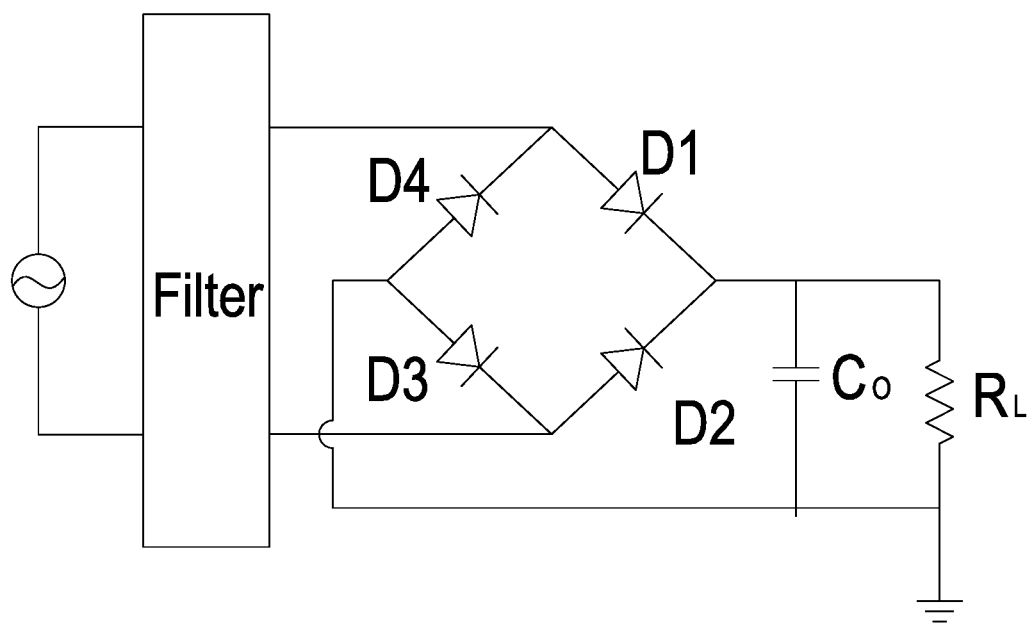
FIG. 1 is a circuit distribution diagram of a conventional AC rectifier circuit.
Figure 2:
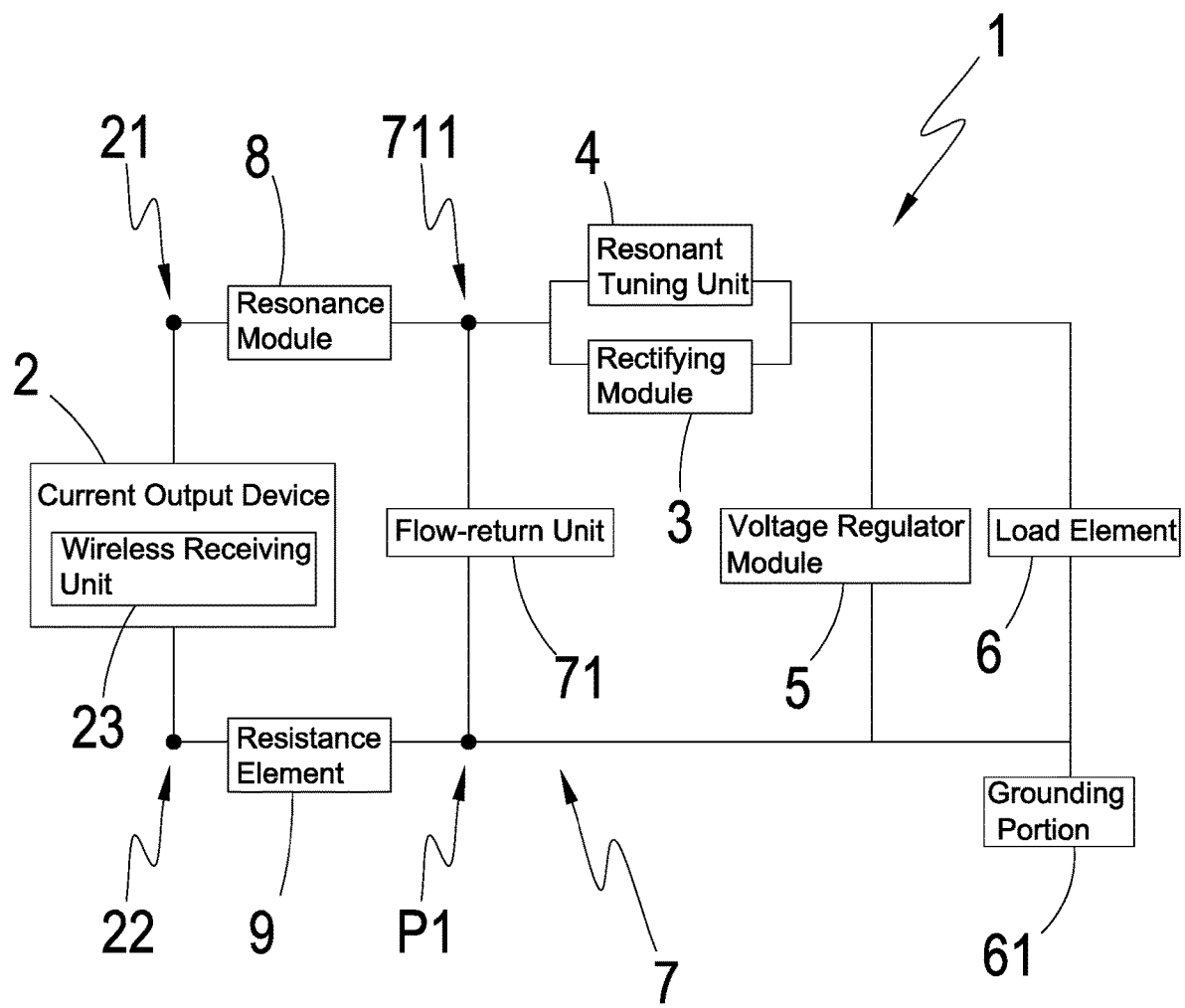
FIG. 2 is an implementation schematic diagram of the first embodiment according to the present invention.

As shown in FIG. 2, the high-frequency half-wave rectification system 1 of the present invention mainly comprises: a current output device 2 having an output end 21 and a first flow-return end 22 respectively at both ends for outputting alternating current, and the current output device 2 comprises a wireless receiving unit 23, wherein the wireless receiving unit 23 is an inductance element; a rectifying module 3 connected in series with the output terminal 21 (represented by a diode in this embodiment) for adjusting the output power, wherein a second flow-return end 711 is provided between the output end 21 and the rectifying module 3; a resonant tuning unit 4 connected in parallel with the rectifying module 3 for controlling the duty cycle of the rectifying module 3 to a predetermined value, wherein the predetermined value of the duty cycle is 48 nanoseconds (ns) to 81 nanoseconds (ns); a first node P1 defined in one side of the first flow-return end 22 facing away from the current output device 2; a voltage regulator module 5, wherein one end of the voltage regulator module 5 is connected in series with the rectifying module 3 and the other end is connected to the first node P1; at least one load element 6 connected in parallel with the voltage regulator module 5; a grounding portion 61 set in one side of the load element 6; at least one flow-return path 7 defined between the first node P1 and the first flow-return end 22 for guiding the current flown out of the voltage regulator module 5 to the current output device 2; wherein the flow-return path 7 has a flow-return unit 71 having two ends connected to the first node P1 and the second flow-return end 711 respectively for guiding the current flown out of the voltage regulator module 5 to the rectifying module 3; a resonance module 8 set between the output end 21 and the second flow-return end 711 for reducing the electromagnetic interference (EMI) of the high-frequency half-wave rectification system 1; and a resistance element 9 set between the first node P1 and the first flow-return end 22.

With the aforementioned structure of the components, it can clearly be seen from the figure that this embodiment is mainly applied to a high-frequency rectification system of a megahertz level. In addition, due to the small size of the current wearable electronic device, in the high-frequency half-wave rectification system 1 of the E class AC circuit, a flow-return unit 71 is added to the flow-return path 7 of the voltage regulator module 5 and the load element 6; and so as to improve conversion efficiency of the current output device 2.

Practically speaking, the current output device 2 outputs a current from the output end 21 and then flows to the rectifying module 3 connected in series therewith, and is connected to the flow-return unit 71 at the second flow-return end 711 in the middle. However, in a megahertz high-frequency circuit, the flow-return unit 71 (inductor) is a high-impedance element, and the current flows to the rectifying module 3 and the resonant tuning unit 4 connected in parallel with each other, wherein the resonant tuning unit 4 can be used to control the duty cycle of the rectifying module 3 to make it close to 74 nanoseconds (ns) (typically it is ideally 48 to 81 nanoseconds (ns) in duty cycle D. In this way, the output power of the rectifying module 3 can be effectively adjusted, and the resonance module 8 can be used to assist the operation of the resonant tuning unit 4 to reduce electromagnetic interference meanwhile. When the current flows through the voltage regulator module 5 and the load element 6 and flows to the flow-return path 7, some part of the current can be routed back to the second flow-return end 711 through the first node P1 and the flow-return unit 71, and again it is tuned by the rectifying module 3 and the resonant tuning unit 4 to increase the overall power conversion efficiency, and the rest of the current is returned to the current output device 2 via the first flow-return end 22.

Wherein, the capacitance value algorithm of the resonance module 8 is as follows:

⌈$Zrec=Rrec+jXrec$⌋, and ⌈$Crx=1/\omega(\omega Lrx+Xrec)$⌋,

Wherein, the resistance value of the load element 6 is $Zrec=Rrec+jXrec$ (Rrec is the real load value, jXrec is the imaginary load value), Crx is the capacitance value of the resonance module 8, and Lrx is the inductance of the wireless receiving unit 23.

Figure 3:
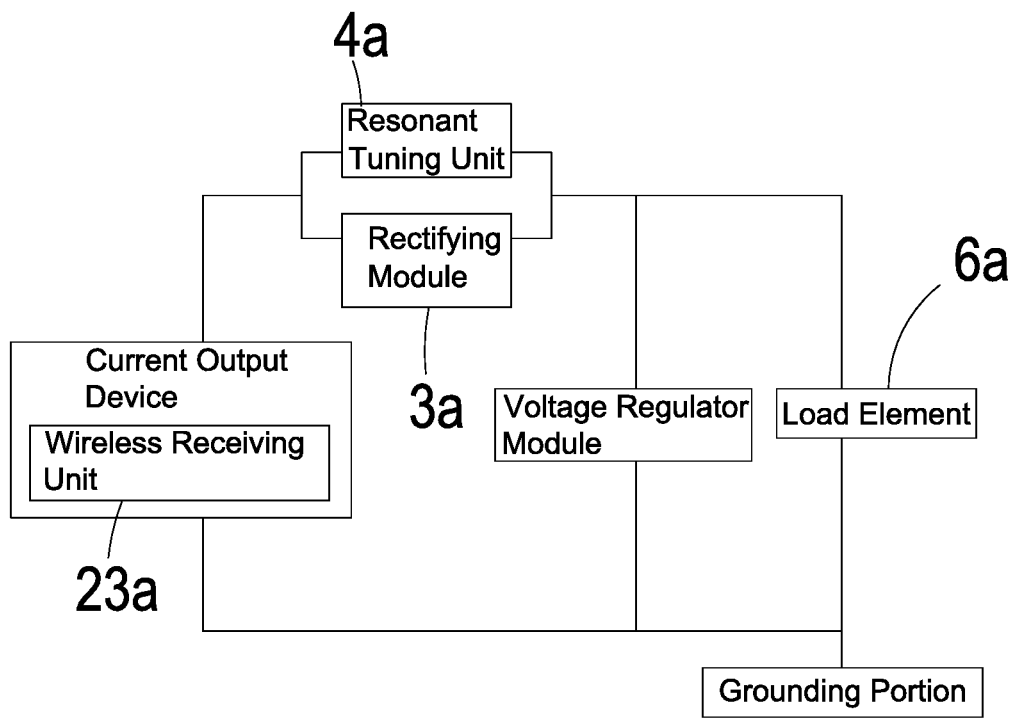
FIG. 3 is an implementation schematic diagram of the second embodiment according to the present invention.

As shown in FIG. 3, which is more specifically for the low-power electronic equipment (power is below 1 watt, load conditions for RL>100), in the class E AC half-wave rectification circuit, the circuit can be simplified by the technology of the present invention, that is, the flow-return unit is incorporated into the wireless receiving unit 23*a*, and combined the resonance module into the resonant tuning unit 4*a*. As for the resonant tuning unit 4*a* which can control the rectifying module 3*a* utilizing the technology ⌈$\omega Lrx+Xrec=0$⌋, and the algorithm below to set the capacitance value of the resonant tuning unit 4*a*.

$$C_r = \frac{1 + \frac{(\sin 2\pi D + 2\pi(1-D))^2}{1-\cos 2\pi D} - 2\pi^2(1-D)^2 - \cos 2\pi D}{2\pi\omega\left(R_L + \frac{r_{D_r}}{2\pi}(2\pi D - \sin 2\pi D + (1-\cos 2\pi D)\cot\phi_{rec})\right)}$$

Where ω is the resonance frequency, Lrx is the inductance value of the wireless receiving unit 23*a*, the resistance value of the load element 6*a* is $RL=Zrec=Rrec+jXrec$ (Rrec is the real load value, jXrec is the imaginary load value), Cr is the capacitance of the resonant tuning unit 4*a*, The value D is the duty cycle of the rectifier module 3*a*, $r_{Dr}$ is the internal impedance of the rectifier module 3*a*, and Φrec is the initial phase of the input sinusoidal current.

Figure 4:
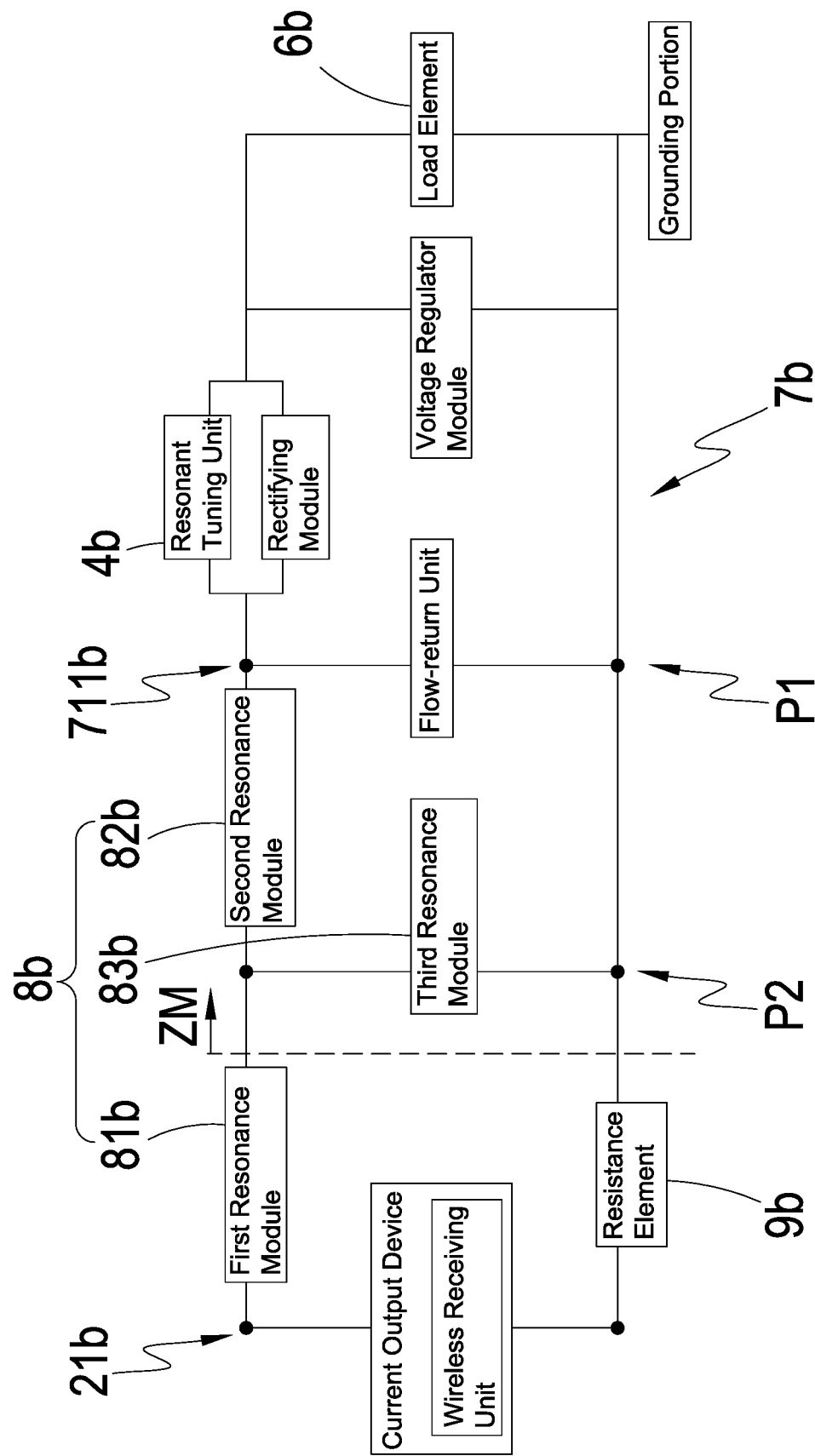
FIG. 4 is an implementation schematic diagram of the third embodiment according to the present invention.

As shown in FIG. 4, a resonance module 8*b* further comprises a first resonance unit 81*b* set in one side of an output end 21*b*, a second resonance unit 82*b* set in one side of a second flow-return end 711*b*, a second node P2 defined in a flow-return path 7*b* and between the first node P1 and a resistance element 9*b*, and a third resonance unit 83*b* set between the first resonance unit 81*b* and the second resonance unit 82*b*; wherein the first resonance unit 81*b* and the resonance unit 82*b* are connected in series with each other, and the end of the third resonance unit 83*b* facing away from the first resonance unit 81*b* is connected to the second node P2.

In this way, using the first resonance unit 81*b*, the second resonance unit 82*b*, and the third resonance unit 83*b* to more accurately calculate the effective capacitance value of the resonance module 8*b*, and so as to further improve the work of a auxiliary resonant tuning unit 4*b*; and at the same time, the electromagnetic interference problem can be reduced, and the problem of low mutual inductance (insufficient success ratio) can also be solved when the mutual inductance is low (K<0.07, where K represents the ratio of the actual mutual inductance of two coils to the maximum mutual inductance).

The capacitance value of the resonance module 8b needs to be calculated based on the input load marked at Zm in the figure, and the algorithm is as follows:

$$Z_m = R_m + jX_m$$

$$R_m = \frac{Z_{rec}}{\omega^2 C_{mnp}^2 Z_{rec}^2 + \left(1 + \frac{C_{mnp}}{C_{mns}}\right)^2}$$

$$X_m = -\frac{\omega}{C_{mnp}} * \frac{Z_{rec}^2 + \frac{C_{mnp} + C_{mns}}{\omega^2 C_{mns}^2 C_{mnp}}}{\omega^2 Z_{rec}^2 + \left(\frac{1}{C_{mnp}} + \frac{1}{C_{mns}}\right)^2}$$

Where ω is the resonant frequency, the resistance value of the load element 6b is Zrec=Rrec+jXrec (Rrec is the real load value, jXrec is the imaginary load value), Cmns is the capacitance value of the second resonance unit 82b, and Cmnp is the third resonance unit 83b.

We claim:

1. A high-frequency half-wave rectifier system of low-harmonicity and high-efficiency, which mainly comprises:
    a current output device having an output end and a first flow-return end respectively at both ends for outputting alternating current;
    a rectifying module connected in series with the output end of the current output device for adjusting an output power;
    a resonant tuning unit connected in parallel with the rectifying module for controlling a duty cycle of the rectifying module at a predetermined value;
    a first node located to a side of the first flow-return end farther away from the current output device;
    a voltage regulator module; wherein one end of the voltage regulator module is connected in series with the rectifying module and the other end is connected to the first node;
    at least one load element connected in parallel with the voltage regulator module;
    a grounding portion set in one side of the load element;
    at least one flow-return path between the first node and the first flow-return end for guiding a current flown out of the voltage regulator module to the current output device;
    a second flow-return end provided between the output end and the rectifying module;
    a flow-return unit having two ends connected to the first node and the second flow-return end respectively for guiding the current flown out of the voltage regulator module to the rectifying module;
    a resonance module set between the output end and the second flow-return end for reducing Electro Magnetic Interference (EMI) of the high-frequency half-wave rectification system; and
    a resistance element set between the first node and the first flow-return end.

2. The high-frequency half-wave rectifier system of low-harmonicity and high-efficiency according to claim 1, wherein the current output device comprises a wireless receiving unit.

3. The high-frequency half-wave rectifier system of low-harmonicity and high-efficiency according to claim 1, wherein the resonance module comprises a first resonance unit and a second resonance unit end-to-end connected between the output end and the second flow-return end; and the high-frequency half-wave rectifier system further comprises a third resonance unit having an end connected to a node between the first and second resonance units and having the other end connected to a second node in the at least one flow-return path between the first node and the resistance element.

4. The high-frequency half-wave rectifier system of low-harmonicity and high-efficiency according to claim 1, wherein the predetermined value is 48 nanoseconds (ns) to 81 nanoseconds (ns).

* * * * *